Dec. 6, 1966            W. HAMMER          3,289,714
MULTIPLE VERTICAL SPINDLE WOODWORKING MACHINE
AND METHOD OF WOODWORKING
Original Filed Oct. 26, 1961            8 Sheets-Sheet 5
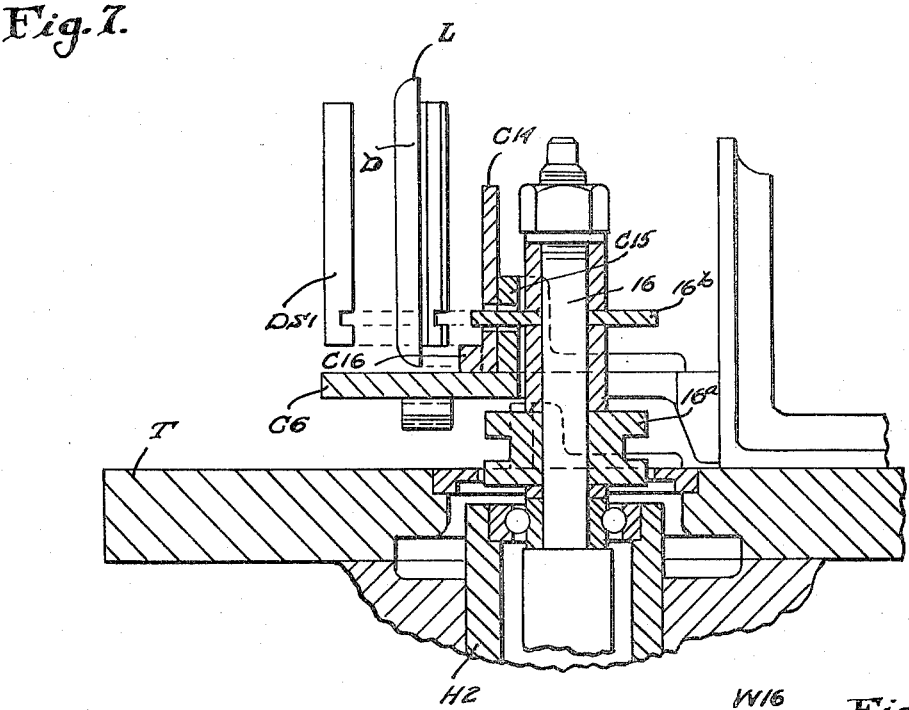
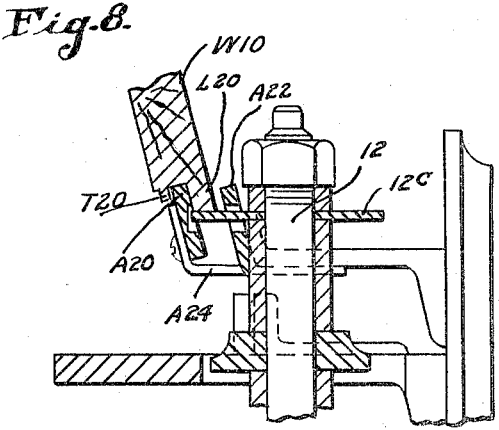
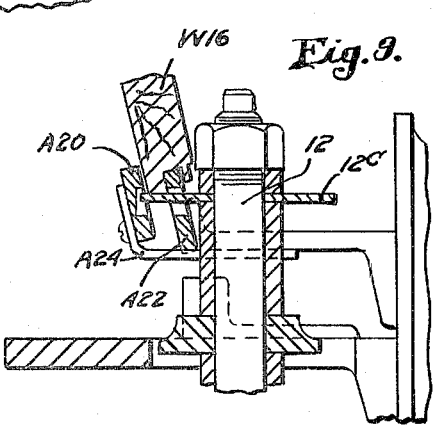
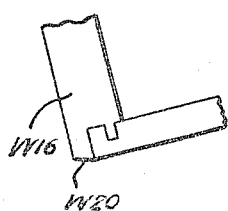
INVENTOR.
Waldemar Hammer Dec. 6, 1966 W. HAMMER 3,289,714
MULTIPLE VERTICAL SPINDLE WOODWORKING MACHINE
AND METHOD OF WOODWORKING
Original Filed Oct. 26, 1961 8 Sheets-Sheet 6
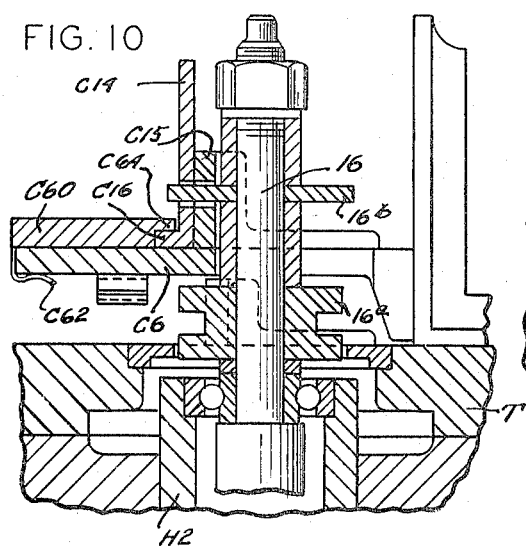
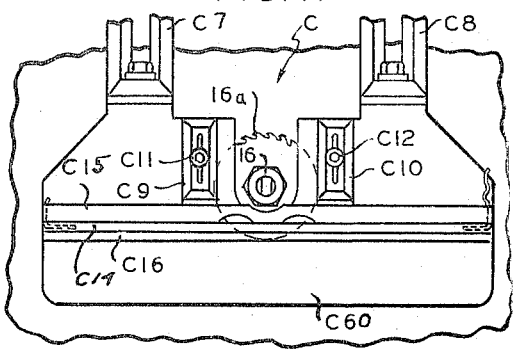
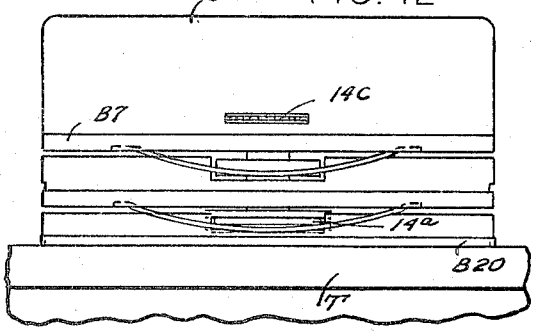
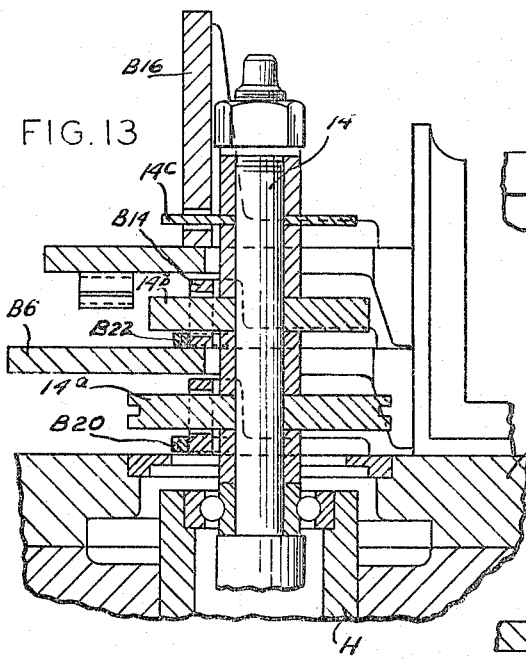
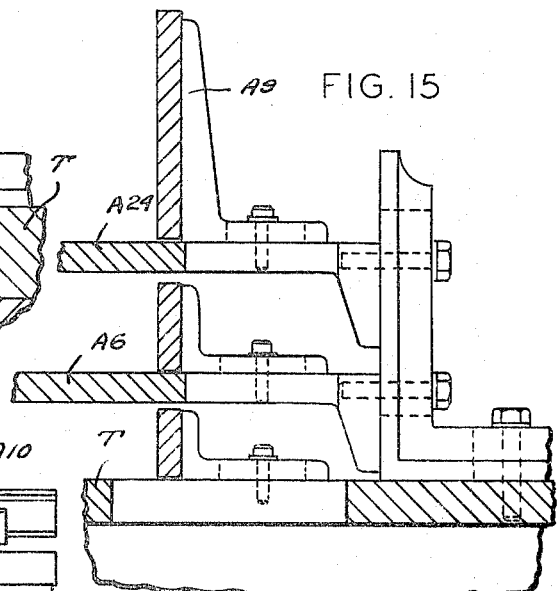
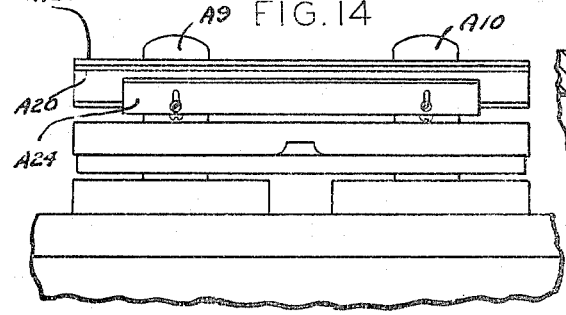
INVENTOR
Waldemar Hammer
BY
Munn & Hamilton
ATTORNEY

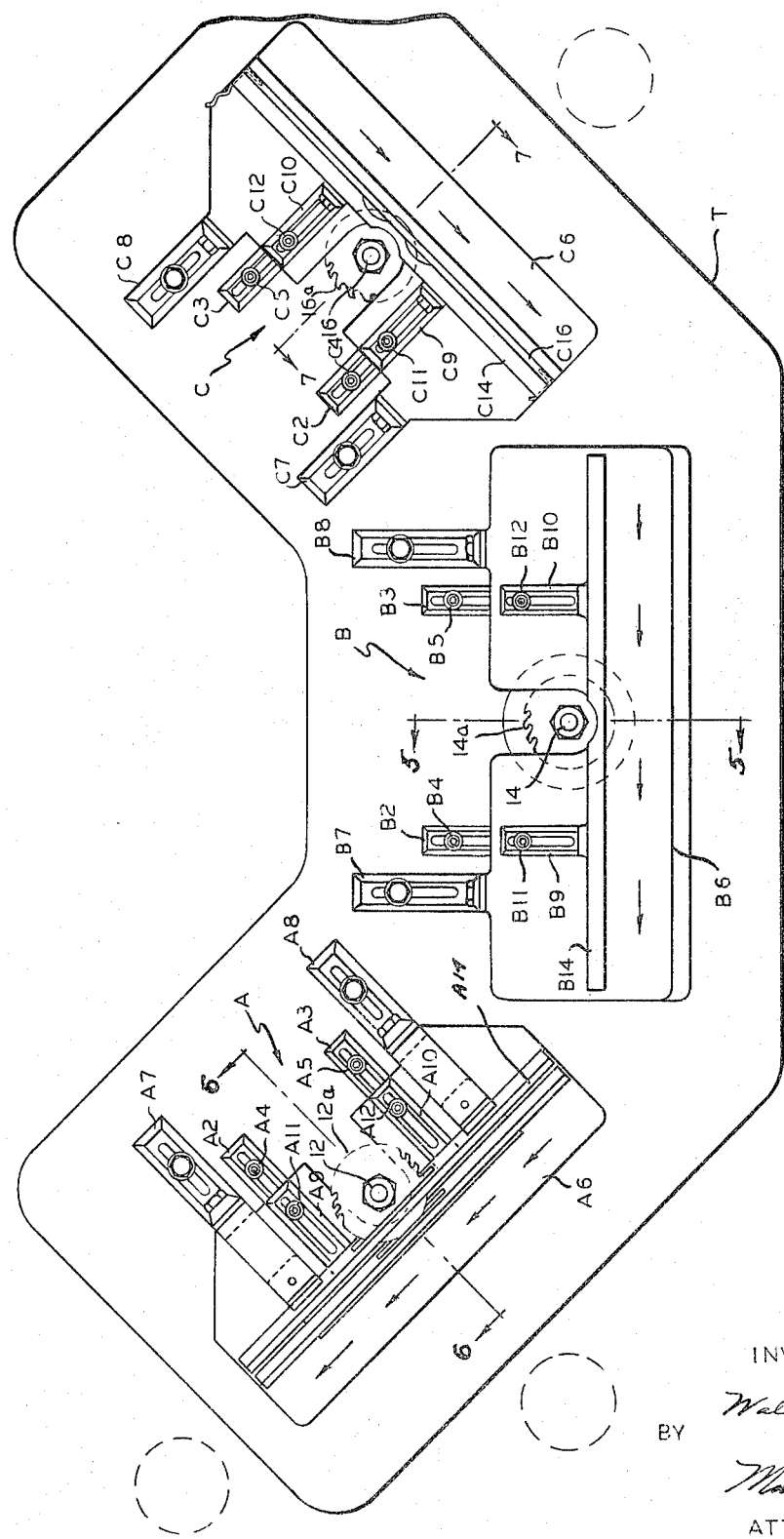

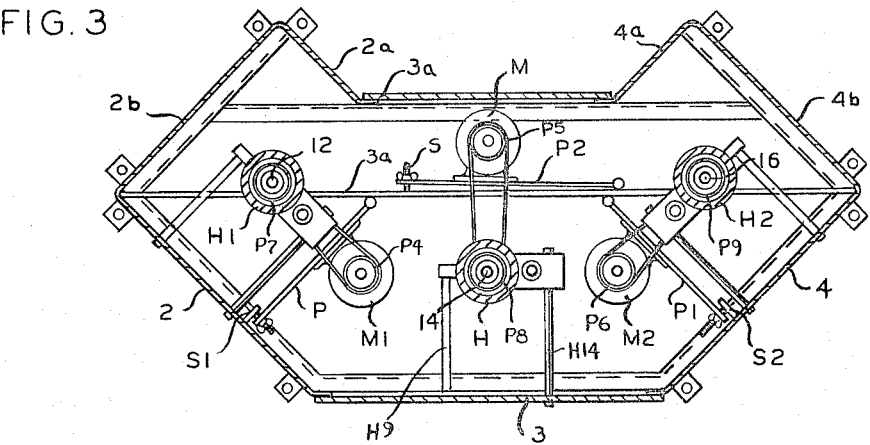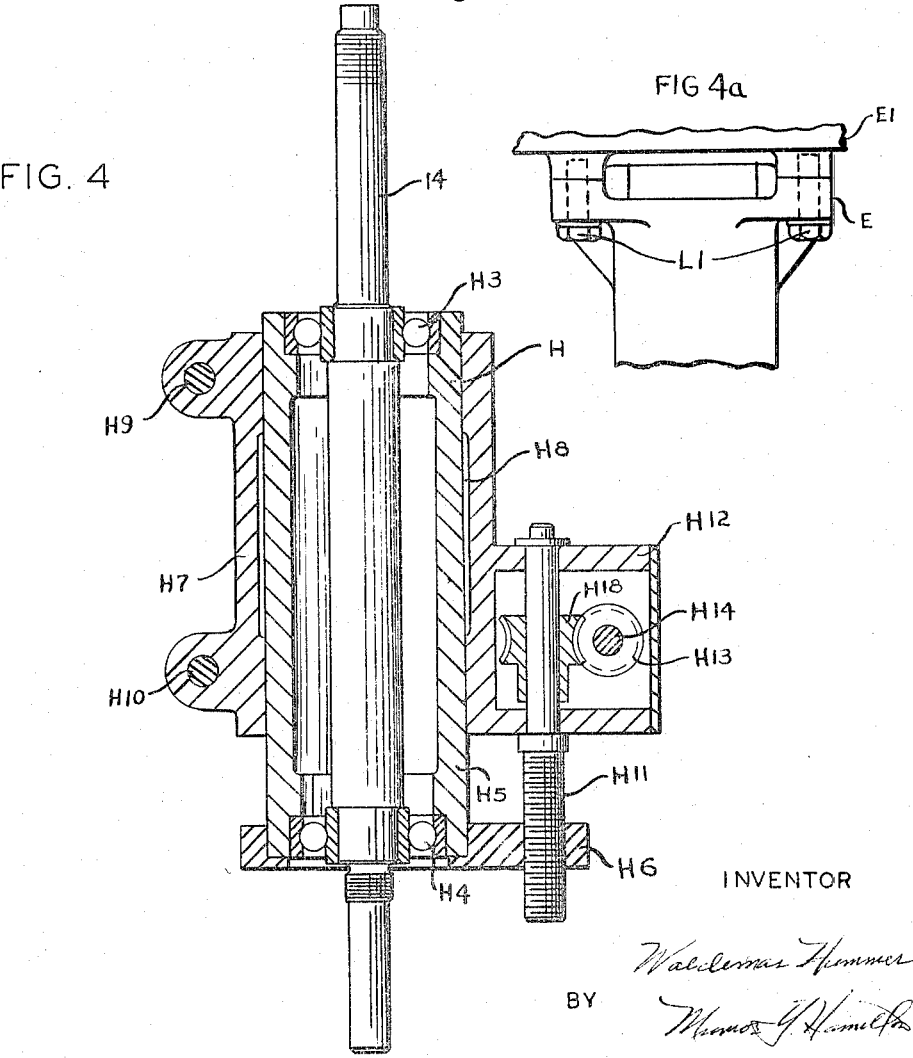

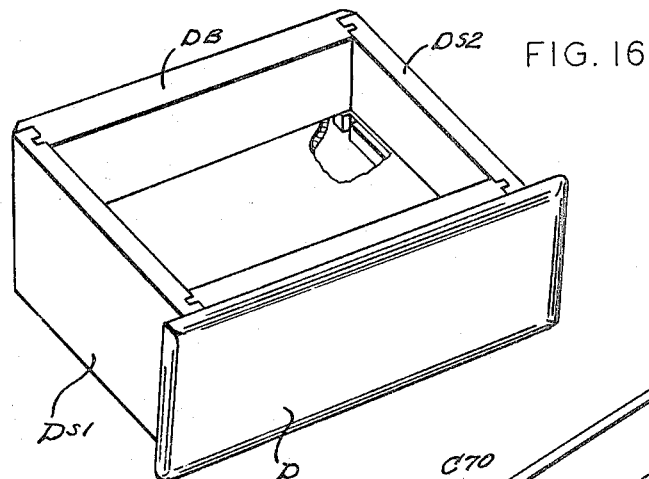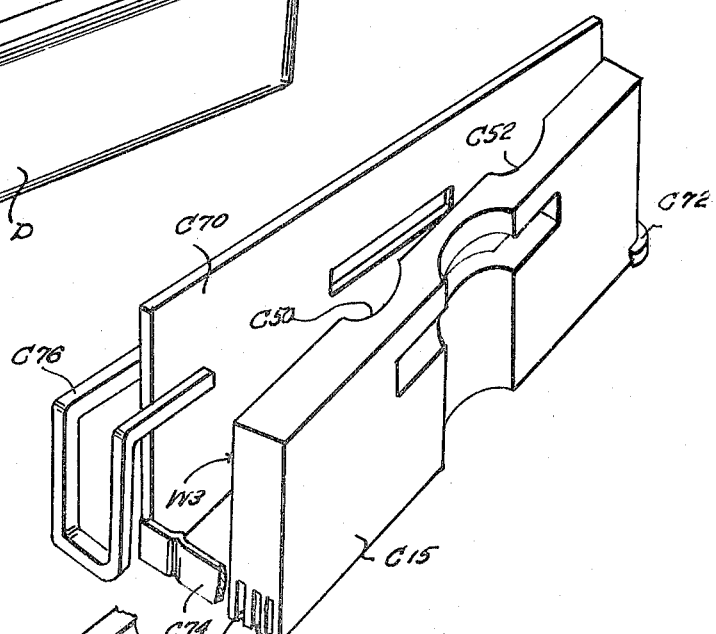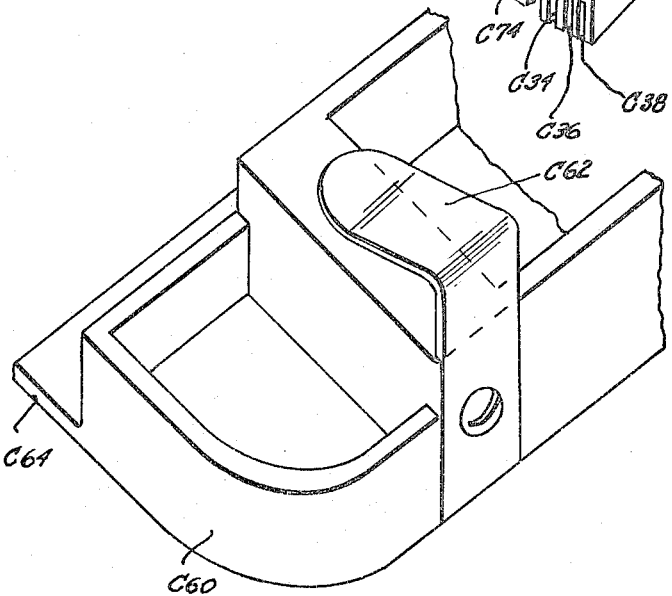

United States Patent Office 3,289,714
Patented Dec. 6, 1966

3,289,714
MULTIPLE VERTICAL SPINDLE WOODWORKING MACHINE AND METHOD OF WOODWORKING
Waldemar Hammer, 972 Petaluma Hill Road, Santa Rosa, Calif.
Continuation of application Ser. No. 147,814, Oct. 26, 1961. This application July 13, 1964, Ser. No. 383,549
15 Claims. (Cl. 144—1)

This invention relates to power tools and to a method and apparatus for carrying out woodworking operations. More particularly, the invention is concerned with a machine having novel spindle holder adjusting mechanism and dimensional guide means which are designed specifically for making cabinet drawer components. The present application is a continuation application of my co-pending application Serial No. 147,814 now abandoned, filed October 26, 1961, a continuation-in-part application of Patent No. 3,008,501.

In usual shop practice for cutting cabinet drawer components, it is customary to employ several different machine setups, each of which is arranged to make a certain type of cut on a workpiece and frequently the depth or spacing of a cut on one drawer component has to be located in some definite relationship to cuts in the other drawer components. The thickness of stock forming the components may also vary throughout a range of sizes depending upon the requirements of any particular job to be done. As is well known to those skilled in this art, a common practice is to correctly adjust each cutting element by first making test cuts to insure that the parts will fit properly. This takes time and has to be repeated where the sizes of the stock are changed. In some cases when one cut has been completed on a workpiece, the latter member is thereafter picked up and carried to another machine setup for further working. Such handling operations increase the amount of time required to cut the drawer components and thus add to the cost of the work.

A chief object of the invention is to provide an improved woodworking machine which can be employed to make a wide range of cuts commonly employed in the woodworking industry.

Another more specific object is to provide an improved machine for making cabinet drawer components, and to combine in such a machine a plurality of adjustable cutters and dimensional guide units arranged in such relationship to one another that any one of several drawer components may, in a single handling operation, be subjected to a series of required cuts in rapid succession without the operator letting go of the workpiece until it has been completed.

Another object of the invention is to provide an arrangement of interchangeable guide and fence elements occurring in uniformly graded sizes which are related to the size of cutters and to the positioning of vertically adjustable spindles and spindle holder members whereby cabinet drawer stock occurring in different sizes may be accommodated and satisfactory adjustment of cuts made without having to reset the cutter spindles or change cutters at the several cutting stations.

Still another object of the invention is to devise a novel adjustable spindle holder mechanism by means of which spindles and cutters may be precisely adjusted and maintained in correct cutting relationship in a work supporting table of the class described.

Still another object is to provide a plurality of work supporting and guide units which cooperate with spindle holders and cutters to provide for carrying out a series of required cutting operations in a predetermined sequence so that forming one cut may determine the location or size of another cut.

Still another object is to devise an interchangeable guide assembly which may be employed to carry out novel bevel cuts on stock which has already been formed with a dado cut or other types of cuts.

Having in mind the foregoing objectives, I have conceived of a novel combination of spindle adjusting means, cutters and dimensional guides which are specifically organized in relation to one another so as to process components of a cabinet drawer and drawer frame construction in a unique manner. In one preferred form the invention is concerned with a cabinet drawer construction of the overlapping front type wherein rabbet and locking tongue joints are employed to secure a drawer front and drawer back to respective opposite ends of two drawer sides. The drawer components required in such a construction include a drawer front, a drawer back, two drawer sides, and a drawer bottom, together with suitable transverse and longitudinal frame pieces. The invention is hereinafter described with reference to a drawer construction of this class although this is not done in any limiting sense.

It will be observed that four of the locking joints occur in a fully assembled drawer of this type. Therefore, the drawer front may require two cuts at opposite ends thereof to provide dadoes and locking tongues. There will also be required rabbet cuts at the top and bottom edges of the drawer front and all of the rabbeted portions may require a rounded finish or "bull nose cut." Finally, the drawer front requires a cut at its lower inner surface to provide a groove in which the drawer bottom is to be received. A total of seven cuts is thus required to process this drawer front component.

Similarly, the drawer back will require at opposite ends thereof two cuts for forming respective rabbets and locking tongues, and the drawer sides will require, at opposite ends thereof, four cuts for forming tongue slots and two grooves for receiving the drawer bottom. Thus it will be seen that fifteen different cutting operations are required to be carried out in making these four drawer components.

In accordance with the invention, I have devised a unique arrangement of parts whereby I am enabled to carry out the fifteen different cutting steps noted, as well as others, by utilizing a limited number of five cutters which are mounted on a single stand or base member. The stand is an upright enclosure body which is constructed with angularly disposed sides to provide a plurality of operator standing areas. At the upper side of the stand I provide a main horizontal work table and a plurality of guide and fence surfaces hereinafter described in detail.

The stand has received therewithin three pivotally mounted driving motors which are combined in a novel manner with three vertically adjustable spindle holder assemblies. An important feature of the invention consists in the mounting and operation of the spindle holder assemblies. These holder assemblies cooperate with the various cutters and guide elements to provide a wide range of vertical adjustment. The spindle holder assemblies are, in accordance with the invention, secured at the underside of the adjustable work table and are uniquely arranged in offset or angularly disposed relationship to one another. Also included in each spindle holder assembly are vertical adjustment screw devices which can be operated externally of the housing. The spindle holder assemblies support a plurality of spindles and respective cutters at various cutting levels. A further important feature of this invention consists in specially sized guide plates and guide elements arranged to cooperate with one another and with certain cutters on the spindles to carry out drawer cutting steps in a predetermined sequence and for different sizes of workpieces.

These and other objects and novel features will be more fully understood and appreciated from the following description of a preferred embodiment of the invention selected for purposes of illustration and shown in the accompanying drawings, in which:

FIG. 2 is a plan view of the woodworking machine shown in FIG. 1;

FIG. 3 is a plan view of the machine stand with the top removed to show details of adjustable spindle holders in section and respective driving motors;

FIG. 4 is a detail view illustrating a spindle holder structure and adjusting screw mechanism for locating the spindle holder in desired positions;

FIG. 4a is a fragmentary view of holding lugs for securing these parts in spindle holder mechanism;

FIG. 7 is a fragmentary cross sectional view taken approximately on the line 7—7 of FIG. 2 illustrating drawer bottom groove cuts;

FIG. 8 is an enlarged cross sectional view of a portion of the spindle guide fence of FIG. 6 for carrying out a special angle cutting operation;

FIG. 8a is a fragmentary detail view of an angle cut in a drawer front;

FIG. 9 is a detail cross sectional view similar to FIG. 8 but showing an angle cut for a drawer back;

FIG. 9a is a detail view of a drawer back with angle cut;

FIG. 10 is a detail cross sectional view showing a combination of guide element and horizontal spacing plate for cutting differently sized workpieces;

FIG. 11 is a detail cross sectional view illustrating a novel fence arrangement in which special line viewing means are provided;

FIG. 12 is a detail elevational view of detachable guide plates corresponding to the plates shown in FIG. 2;

FIG. 13 is a detail cross sectional view of the cutter unit of FIG. 5 but further equipped with lateral spacing guide elements;

FIG. 14 is a fragmentary front elevational view of the angle fence arangement shown in FIG. 6 more clearly showing a dado slot guide and a dado back guide;

FIG. 15 is a side elevational view partly in cross section of the adjustable fence means shown in FIG. 5;

FIG. 16 is a perspective view showing completed drawer components in assembled position;

FIG. 17 is a perspective view of laterally adjustable cooperating fence elements, together with means for positioning the fence elements in varying positions of spaced relationship;

FIG. 18 is a fragmentary perspective view of the horizontal spacing plate shown in FIG. 10;

Figure 1:
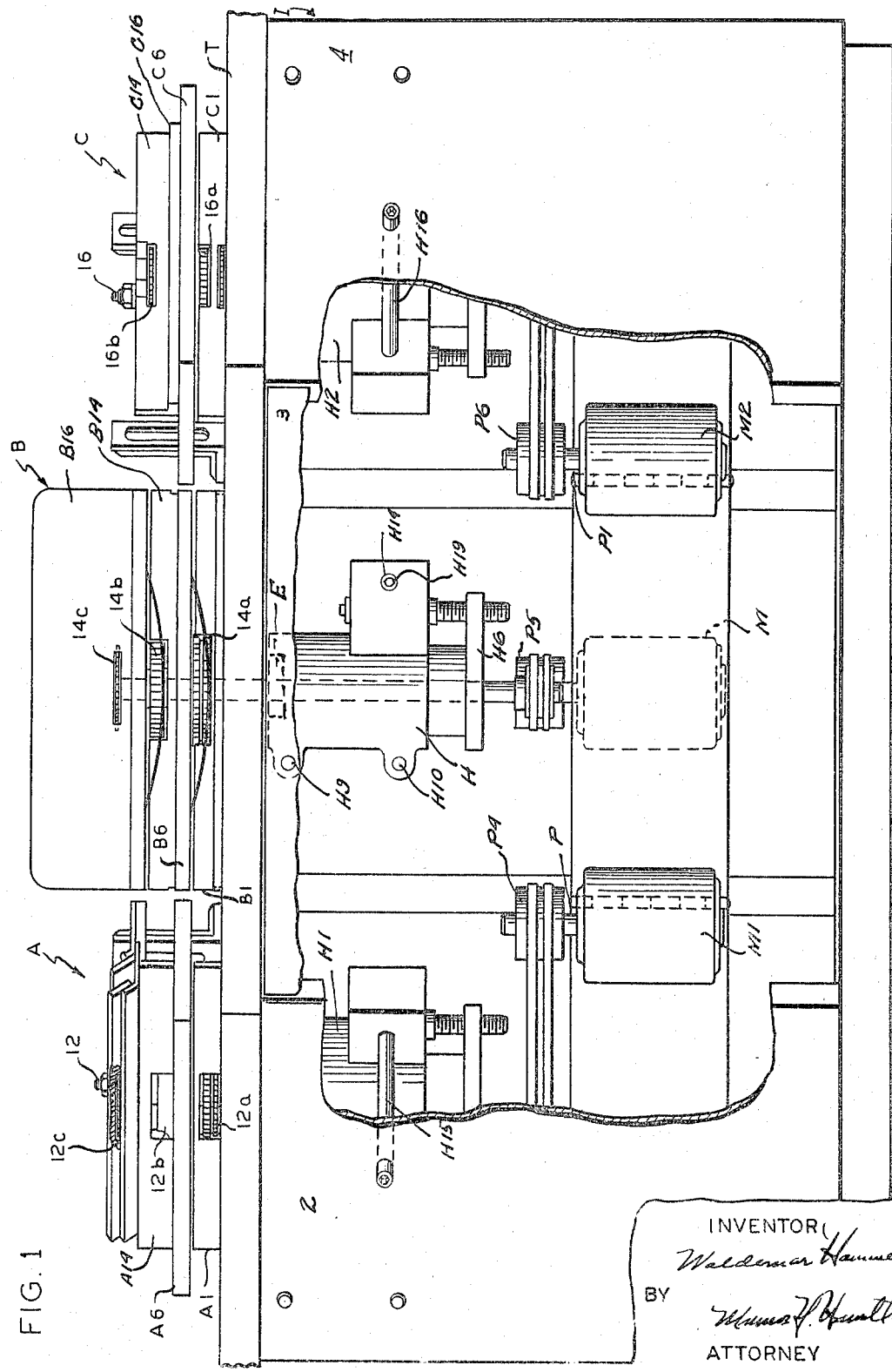
FIG. 1 is a view in front elevation showing the woodworking machine of the invention and also indicating an arrangement of power driving spindles, cutters and fences mounted at the upper side of the machine.
Figure 5:
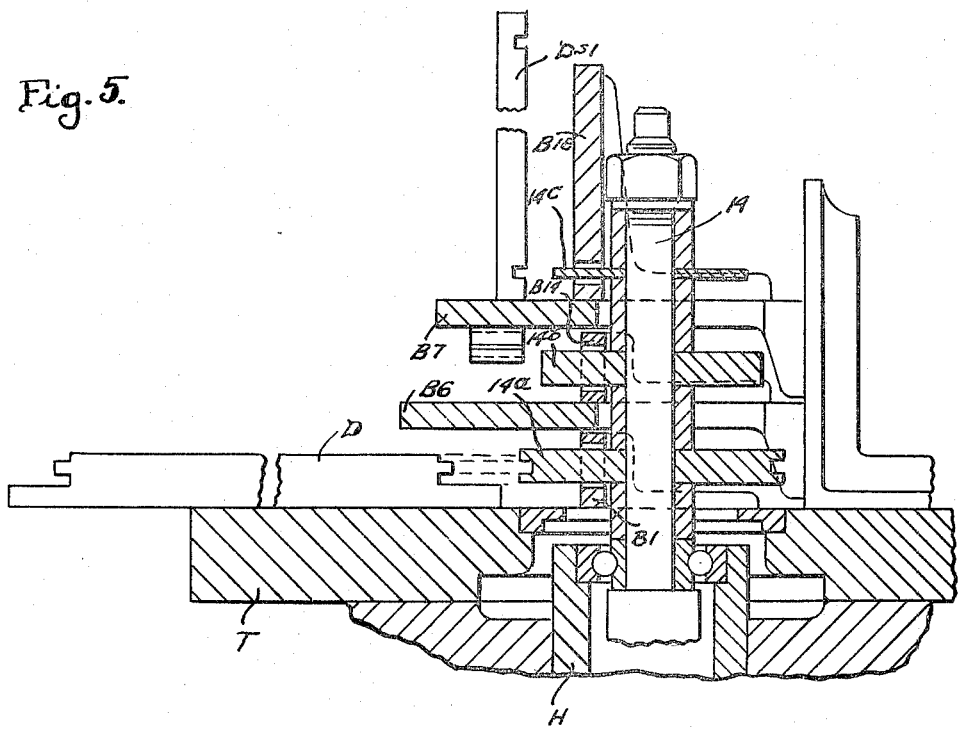
FIG. 5 is a fragmentary cross sectional view taken approximately on the line 5—5 of FIG. 2 and further illustrating drawer components with cuts formed therein.

Considering in greater detail the structure shown in the drawings, T denotes a work supporting table mounted on a stand I, best shown in FIGS. 1, 2 and 3. As may be better seen in FIG. 3, the stand includes vertical front walls 2, 3 and 4 which are arranged to extend angularly with respect to one another so as to define a plurality of operator standing areas.

Also provided are vertical rear walls 2a, 3a and 4a (FIG. 3) which extend substantially parallel to walls 2, 3 and 4. The space between the front and rear walls described is closed by end walls 2b and 4b to comprise an enclosed area for housing power driving units M, M1 and M2 of the machine. To support these power driving units, which may preferably consist of electrical motors, I further construct the stand with a vertical supporting partition 3a rigidly secured between the sidewalls 2 and 4, as shown in FIG. 3. This member constitutes a novel reinforcing member for bracing opposite sides of the stand while at the same time supporting a plurality of driving motors in a raised position.

As will be noted in FIGS. 1 and 2, the motors M, M1 and M2 are preferably arranged in staggered relationship at opposite sides of the partition 3a and are hinged for swinging about vertical axes of hinging brackets P, P1 and P2. Each of the brackets is adapted to be adjustably positioned by means of adjustment screws as S, S1, S2 located as shown in FIG. 3. By means of this pivot mounting, each motor may be conveniently moved into position to provide a correct tension on a set of driving pulleys P4, P5, P6 mounted immediately above respective motors as shown.

At the underside of the work table and in close proximity to the motors, I provide specially devised spindle holding units H, H1, H2 which are rigidly secured to the underside of the table T by means of lug portions E (FIGS. 1 and 4a) through which extend bolts L1 threaded into the underside of the table T. Suspended at the lower ends of these spindle holder units are respective pulleys P7, P8 and P9, which are belted to pulleys P4, P5 and P6 of the motors noted above. Also supported in respective spindle holder units are driving spindles 12, 14 and 16 which are adapted to carry a series of cutters at their upper extremities as hereinafter described.

In FIG. 4, I have illustrated in greater detail the spindle holder unit H which includes upper and lower bearings H3 and H4 located in a sleeve member H5 whose lower end is supported on a vertically adjustable base H6. Surrounding the sleeve H5 is a clamp H7 which is keyed to the outer surface of the sleeve as shown at H8 and which is adjustably secured by clamping screws H9 and H10.

The clamp H7 has integrally formed at one side a gear box H12 through which extends a vertical adjusting screw H11 which is threaded into the base H6 as shown. Fixed to the screw at a point within the gear box H2 is a worm gear H18 which is in mesh with a worm H13 fixed on an adjustment worm shaft H14. The latter member H14 is recessed at H19 (FIG. 1) to take a wrench head and together with similar members H15 and H16 are of elongated construction as shown in FIG. 1 and are adapted to terminate at the outer surface of the stand in a slightly recessed position. By turning the member H14 into a desired position the spindle may be raised or lowered to any desired height. In the recessed position desired the adjusting worm screws are protected against accidental turning.

In this connection it is further pointed out that when an operator picks up a workpiece and moves it rapidly along through successive cutting stations until a required number of operations have been completed, it is important to remove all projecting parts from the offset front wall surfaces which define successive operator standing areas. Experience has shown in the practical application of the tool in woodworking shops that if conventional hand wheels are employed for positioning the spindles and cutters at a desired height, these wheels necessarily extend outwardly from the table into a projecting position such that they interfere with an operator moving from one station to another. In addition, trouble is experienced from accidental turning of the hand wheel with the result that precise adjustments established for a multiple processing operation may be thrown out of position and a great loss of time and material may result. With this problem in mind, I have found that the special spindle holder and adjusting mechanism described with the elongated adjusting shafts being received with their extremities recessed in the vertical table surfaces do not interfere with movement of the operator and cannot be accidentally displaced to interfere with setting and can be solidly locked in any desired position.

In the preferred embodiment of the invention shown in the drawings, I provide on the three spindles 12, 14 and 16, a group of cutters and several sets of cooperating guide elements which are arranged so that the size and location of one cut may control the size and location of subsequent cuts, while at the same time accommodating different thicknesses of stock.

The various cutters are best shown in FIGS. 1, 5, 6 and 7 and include, on spindle 12, a bottom cutter 12a, an intermediate cutter 12b, and a top cutter 12c; on spindle 14, a bottom cutter 14a, an intermediate cutter 14b, and a top cutter 14c; on spindle 16, a bottom cutter 16a, and a top cuter 16b.

The cutters noted, together with dimensional guide elements hereinafter described, comprise three cutting stations. These cutting stations are generally indicated by the arrows A, B and C respectively as shown in FIG. 1. station B includes a table T and a vertical fence section A1, a raised table A6 and a second fence A14. Similarly, station B includes a tabe T and a vertical fence section B1, a raised table B6 and a second fence B14, a raised table B7 (FIG. 5) and a fence B16. Station C includes table T, a vertical fence section C1, a raised table C6 and a second fence C14.

It will be observed that the several stations are angularly disposed with respect to one another and cooperate with the main work supporting table T and the offset spindles and cutters in such a way that there are produced three separate guideways, any one of which extends at an angle to an adjacent guideway. This facilitates successive cutting operations as an operator moves from one station to another.

The bottom fence unit A1 may be supported, for example, by angle brackets A2 and A3 which are horizontally adjustable on the table T, as shown in FIG. 2. These angle brackets include vertical end portions which are bolted to the fence section A1 at two spaced apart points. Similarly, the bottom fence section B1 is supported on angle brackets B2 and B3 which are horizontally adjustable on the table T, as also shown in FIG. 2; and finally the bottom fence section C1 is mounted on angle brackets C2 and C3 in the manner described.

Each of the angle brackets is formed with a slotted horizontal portion through which are fastened threaded adjustment fastenings as A4, A5, B4, B5 and C4 and C5. By adjusting the angle brackets horizontally along the table, there is afforded one means of controlling the height and depth of cuts produced. Table A6 is adjustably supported in a raised position, as shown in FIGS. 1 and 2 by means of angle brackets A7 and A8. Each of these angle brackets is formed with slotted upright portions in which the table A6 may be vertically adjusted and secured by holding bolts as shown. Similarly, the table B6 is supported on angle brackets B7 and B8 and the table C6 is supported in a raised position by means of angle brackets C7 and C8.

The fence A14 is secured to angle brackets A9 and A10 which are horizontally adjustable and held by fastenings A11 and A12, as shown in FIG. 2. Similarly, fence B14 is secured to angle brackets B9 and B10 in turn held by fastenings B11 and B12. Upper fence section C14 is secured to angle brackets C9 and C10, also as shown in FIG. 2.

With the structure as above described, I further provide additional dimensional guide and fence means. These parts cooperate with one another and with the adjustable spindle holder mechanism to make possible several novel results. One result is to make possible the carrying out of fifteen cuts required in a lock joint drawer construction utilizing only five cutters. Another result is to make it possible for an operator to complete each drawer component in one continuous handling operation without letting go of the component. Another result is to make it possible for an operator to accomplish the two above-noted results utilizing one thickness of stock for the drawer front and a different thickness of stock for the drawer sides. Still another result is to make it possible for almost instant conversion of the entire machine setup to adapt it to different stock sizes without having to reset all of the cutters.

As illustrative of a typical lock joint drawer construction and the preparation of required drawer components based on the use of my dimensional guide and fence means, there may be cited a construction which includes a drawer front to be made from a stock thickness of three-quarters of an inch; and two drawer sides and a back to be made from one-half inch stock.

In such case it will, for example, be desirable to have the drawer front made with a lip which is to overlap the drawer sides by one-quarter of an inch; and to have the tongue slot in the drawer sides not exceeding more than approximately one-half of the thickness of the drawer sides to avoid weakening these members unduly.

It may be assumed that four drawer components have already been cut in desired lengths and widths by conventional means. These components are referred to as drawer front D, a drawer back DB and two drawer sides DS1, DS2, and are processed in accordance with the invention in the following manner.

Cutters suitable for use with the stock sizes noted are selected for mounting on their respective spindles and guide fences put in place. The spindles are located in precise cutting positions using the adjustable spindle holder mechanism. For example, in the case of the drawer front component D, shown in FIGS. 5, 6 and 7 and also in assembled drawer in FIG. 16, I select a dado and locking tongue cutter suitable for use with three-quarter drawer front stock. This cutter has been illustrated in the drawings by cutter 14a, and is correctly adjusted by the adjustable holder mechanism H to a desired height such as that illustrated in FIG. 5. This cutter and its setting establishes the thickness of the stock front lip as well as the spacing of the locking tongue for the stock sizes noted.

Figure 6:
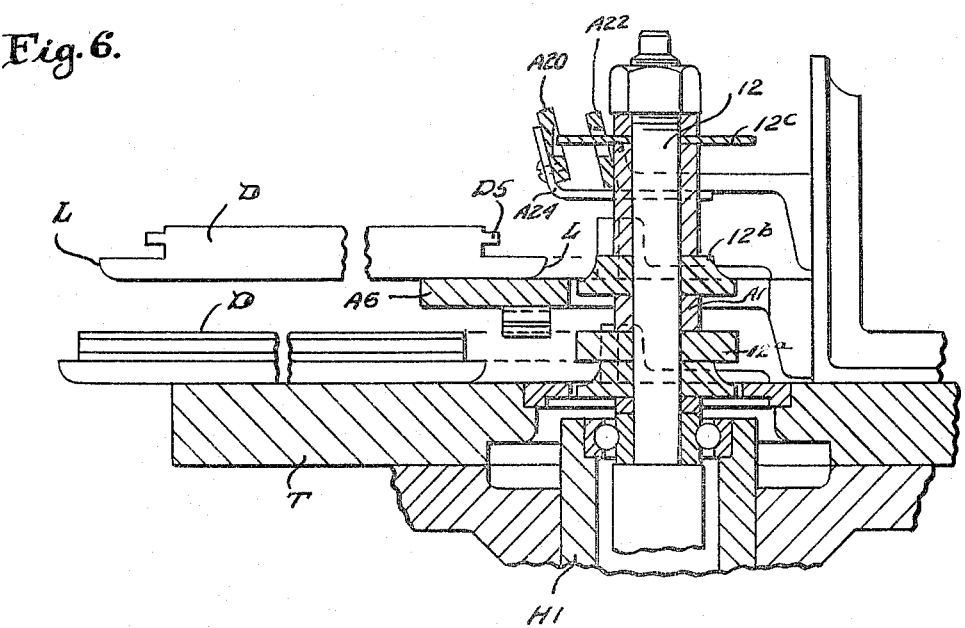
FIG. 6 is a fragmentary cross sectional view taken approximately on the line 6—6 of FIG. 2 and illustrating drawer cuts.

I further employ for this drawer front component D the cutter 12b and the cutter 12a at the left hand station C. These cutters are chosen with reference to cutter 14a and are mounted on the spindle 12 in spaced relation as shown in FIG. 6 with the cutter 12a being vertically adjusted by means of the spindle holder mechanism H1 to provide a correct thickness for the lip L of the drawer front D. Finally, a fourth cutter for the drawer front, namely, cutter 16b, shown at the right hand station C in FIG. 1, and also in FIG. 7, is chosen and mounted so as to locate the cutter 16b at a suitable height in reference to the raised table C6.

I then combine with the cutter 16b dimensional guide means which have already been referred to and which are chosen with reference to the depths of cuts which have been established for the drawer front between cutters 14a, 12b and 12a. For this purpose I employ an inner vertical dimensional guide plate C15 and an outer dimensional guide plate C14 (FIG. 7) which together cooperate to control the depth of cut of the cutter 16b in relation to the thickness of stock specified. In addition to the vertical guide members C14 and C15, I further provide a horizontal dimension guide C16 which is also chosen with reference to the size of the lip L which has been set for the drawer front by the location of the cutters 14a and 12a above described. It will be observed that this dimension guide C16 is selected to have a height which corresponds to the width of the lip L while the horizontal dimension of the member C16 is slightly less than the space between the lip and the inner surface of the drawer front. By thus controlling these two dimensions, it will be observed that a cut may be applied to the drawer front after its lip has been formed so as to give the same relative spacing of the cut from the relieved portion of the drawer front as will occur in applying the same cut to a drawer side which has no lip cut therein.

Finally, I select the locking tongue slot cutter 14c, at station B. This cutter corresponds in size to the size of the tongue of cutter 14a and is located on the vertically adjustable spindle 14 in relation to the raised table B7 so that locking tongue slots for the two drawer sides will occur at a distance above the raised table B7 which corresponds exactly to the distance between the drawer front tongue D5 and the lower front lip L.

With these five cutters thus set in carefully adjusted relation to one another, and as determined by the size of the first drawer component, namely, the drawer front, an operator then proceeds in the following manner.

The drawer front D is picked up by the operator and while standing directly in front of station B, opposite ends of the component are passed through the cutter 14a in two successive steps with the operator merely reversing the position of the drawer front in his hands.

While still holding the drawer front, the operator then steps to the left hand station and passes the two ends through the cutter 12b which forms a rounded finish or bull nose edge at the two ends of the drawer front to provide finished lips L.

Next, the operator without changing his position at station A drops down to table T and passes the top and bottom edges of the drawer front through the cutter 12a in two successive steps. This cutter completes the rabbet for forming the drawer front lip at the top and bottom edges of the drawer front and simultaneously applies the rounded edge or bull nose as shown in FIG. 6.

To complete the required cuts in the drawer front the operator then steps back to the right hand station C, locates the drawer front rabbeted edge on the dimension guide C16 and passes the drawer front through the cutter 16b to provide a groove for receiving the drawer bottom. The drawer front component, now completed, is then placed in position for assembly and no further handling is required for cutting purposes.

The drawer back component may next be processed and this is done at center station B using the same bottom cutter 14a which, with the setting described, automatically locates the dado and locking tongue for the drawer back component in two successive passes. This completes processing of the drawer back in a single handling operation.

Finally, the two drawer sides are processed one after the other. The operator moves to station C, locates a drawer side on the dimension guide C16, and passes the piece through the cutter 16b which forms a drawer bottom groove. While still holding the drawer side cut with the drawer bottom groove, the operator steps to station B and passes the two ends of this drawer side through the cutter 14c in two successive passes. This completes one drawer side. Similar operations are conducted at station C and station B to complete the second drawer sides. The four components may then be assembled in a position such as that shown in FIG. 16, the drawer bottom inserted and the operation is finished.

With the three adjustable spindles, cutters and dimension guides described, an average processing period for an operator to pick up and cut the four drawer components in the manner noted is from a little under one minute to a little over one minute and at a maximum not over a minute and a half. In comparison, to do the same work on separate conventional tables ordinarily requires a period of from ten to fifteen minutes and involves handling each piece several times. The saving in time and handling realized with applicant's invention is a highly important feature.

In addition to the operations above described, it frequently occurs that the four drawer components D, DB, DS1 and DS2 are required to be made from any one of a wide range of stock sizes which may or may not be the same for the drawer front and drawer sides. It will be obvious that a single change in dimension of either the drawer front or the drawer sides will necessitate considerable change if carried out in the conventional manner. However, by using dimension guide elements which are made available in a range of uniformly graded sizes, such changes in dimension of drawer sizes or of stock sizes to be used, may be readily taken care of in a very small interval of time.

For example, with a change in size of the thickness of the drawer sides the depth of the groove for the drawer bottom may have to be changed to prevent weakening of the drawer side while maintaining a suitable retaining depth. I may accomplish this very simply by replacing the dimension guide strip C16 with a similar type of guide strip whose dimension is carefully chosen to provide for the required change in depth in the drawer side.

In FIGS. 20 to 23, I have illustrated various guide members which are employed with the spindle 16 at the right hand station. I may employ the inner fence element C15 alone or with the outer fence element C14, or I may use both of these members with the guide element C16. Also element C16 may be replaced by differently sized but similar guide elements C18 and C20. These guide elements occur in uniformly graded sizes of $\frac{1}{16}''$, $\frac{1}{8}''$, $\frac{1}{4}''$, etc., so that by making a change from one to another a predetermined variation in depth of cut may be realized at any time and these dimensions may be further varied by removing the outer fence C14.

Each of the guide elements C16, C18, C20 are formed with attaching hooks as K, K1 and K2 and also with resilient clips C22, C24 and C26. These resilient clips extend substantially at right angles to the inner surface of respective guides and are formed with rib portions C28, C30, C32. The rib portions described are of a size for detachably engaging in locking detents C34, C36, C38 (FIG. 17) which are formed at one end of the fence member C15. To install any one of the guides C16, C18, C20, it is merely necessary to engage the hooked ends K at one extremity of a fence member as C15 and then snap the spring clips at the other end of the guide into one of the detents described at the opposite end of the fence C15.

I find that by sliding the clips from one detent to another I may obtain still further desirable gradations in depth of cut without removing the guide until a much larger spacing is required and a new guide has to be installed. Thus with each guide there are three positions of spacing in the detents so that with the three guides C16, C18 and C20, there may be accomplished nine different settings of the cutter 16b relative to a workpiece passed thereagainst.

Figure 21:
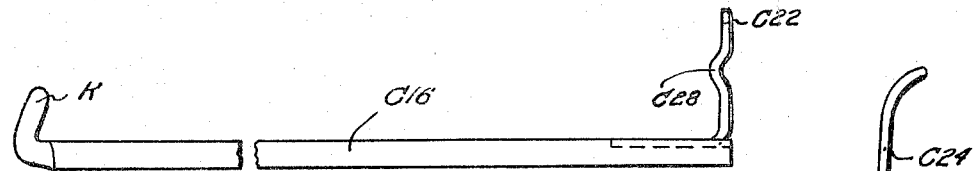
FIGS. 21–23 are views of a series of sizes of guide elements of the invention.
Figure 22:
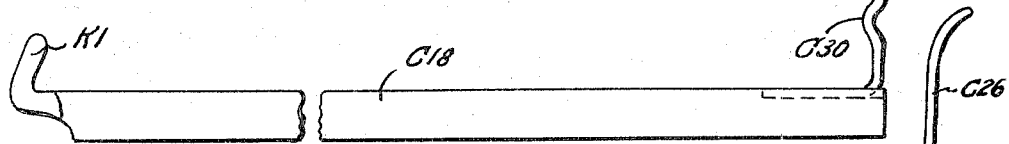
Figure 23:
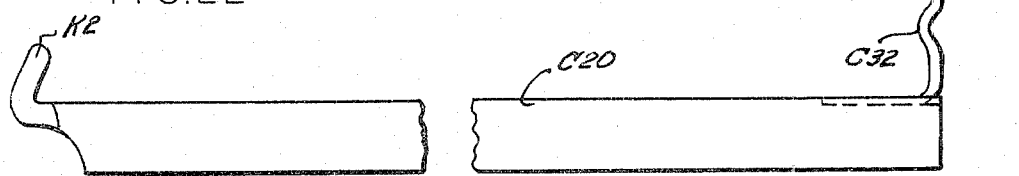

In a similar manner, I may also employ at the center station B, guide strips corresponding to those shown in FIGS. 21, 22, 23, arranged as suggested by the guide strips B20 (FIG. 13), with the result that a change of depth of the drawer may be realized throughout a range of graded sizes without having to change the cutter 14a. Similarly, guide strips as B22 may be used at this center station in cooperation with the vertical fence B14 to control the depth of the cutter 14b.

Figure 20:
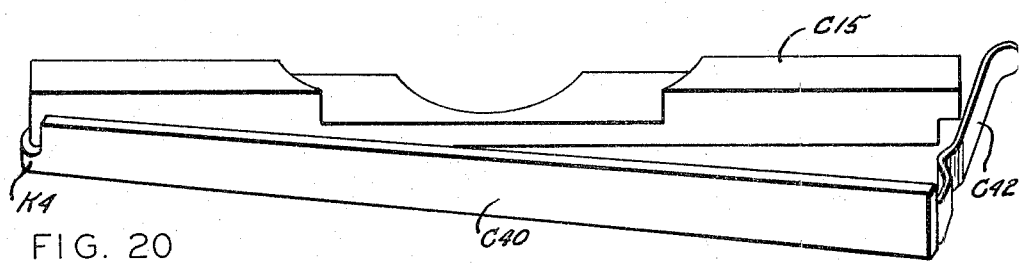
FIG. 20 is a perspective view of the first fence on the center table with a spacing guide element partly disengaged.

I have further provided for use with the vertical fence C15, at station C, a range of dimension guide members corresponding to the guide C40 (FIG. 20). These guide members can occur in a range of uniformly graded thicknesses to take place of the vertical fence C14 and all of these adjustable guide members may be formed with hook portions as K4 and resilient clip portions C42. The height of the fence C14 may be desired to be varied depending upon the length of the drawer side which is to receive a drawer bottom slot.

Figure 19:
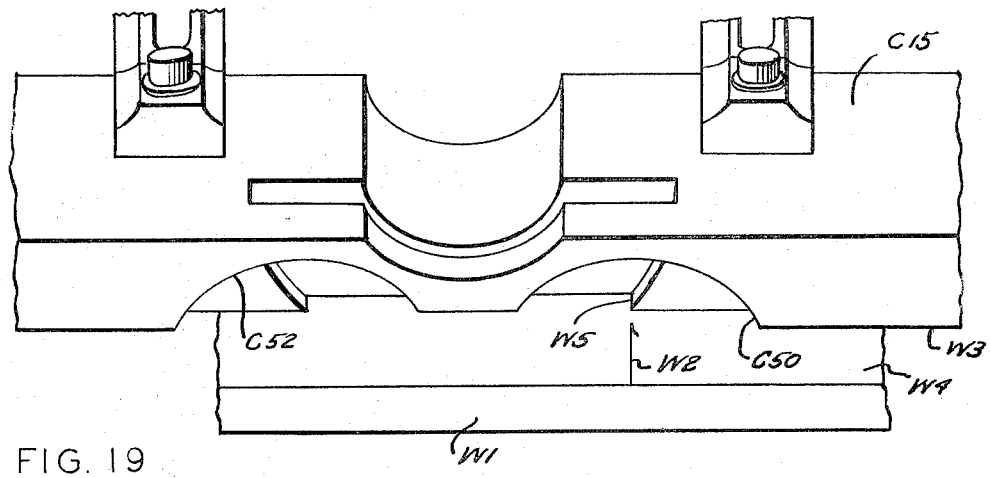
FIG. 19 is a fragmentary perspective view of a fence with line veiwing apparatus shown in relationship to a workpiece.

I have still further formed the fence C15 in a novel manner to provide line viewing apertures which are defined by the circular recessed surfaces C50 and C52, as shown in FIG. 19. It will be understood that normally in passing a workpiece against a fence it is impossible to view the position of the circular cutting element in the work at an intermediate point in the passage of the work through the cutting element. It will also be understood that in some cases it may be highly desirable to terminate this circular cut along a definite line of determination in the workpiece. This, I find, can be accomplished as will be readily apparent from an inspection of FIG. 19. A workpiece W1, previously marked with an indicator W2, is passed along the guide fence C15 in sliding contact with the surface W3. The surface W3 is also shown in another position in FIG. 17. It will be apparent that by means of the arcuate viewing apertures in the member C15, an operator may readily look down onto the inner surface W4 of the workpiece W1. Thus when the indicator line W2 comes into approximate register with the arc of cutting of the cutter 16b as defined by the relieved edge W5 formed in the member C15, the cutting action can be stopped very precisely.

Still another form of dimensional guide member is illustrated in FIG. 18 and is shown in an operative position in FIGS. 10 and 11. This dimension guide member also is designed for use with the cutter 16b at station C and may be combined with the fences C14 and C15 already described. Essentially the dimension guide member consists of a removable plate C60 detachably secured by a spring clip C62 adapted to be resiliently engaged with table C6. This dimension guide C60 is formed, as shown in FIG. 18, with a relieved edge portion C64 adapted to overlie and fit against the dimension guide C16 earlier described. The member C60 may thus function to raise the effective height of the table C6 without requiring a change in setting of table C6 and without having to remove the dimension guide C16 where subsequent use of this member may be required. It will be understood that the member C60 may also be formed with its recessed edge portion 64 occurring in a range of sizes in order to produce various vertical adjustments.

Similarly, I may employ a detachable dimension guide as shown in FIG. 17 and denoted by the numeral C70. This member is also formed with a hook portion C72 and a spring clip C74 adapted to engage in the detents C34, C36, C38. Member C70 provides another means for instantly controlling the depth of the cutter 16b in forming drawer bottom grooves and is further provided with a protective rail C76 for facilitating the handling of certain types of workpieces where a very firm positioning is required.

With the basic simplified spindle and cutter mechanism disclosed, I may also carry out certain other cabinet drawer cutting operations which may or may not be desired to be performed in conjunction with the cutting of the four drawer components already described. For example, I may provide for making bevel cuts, which are frequently resorted to by cabinet makers, at two points in particular. One point is in the processing of a drawer front component of the flush type. In such a drawer construction it is sometimes desirable to provide a bevel which can be sanded to furnish an exact fitting of the drawer front in the drawer opening. A second point where a bevel may be useful is in forming the drawer back with an opposite bevel to facilitate inserting the drawer in a drawer opening along the drawer frame.

Both of these bevel cutting operations may be carried out with the spindle and cutter arrangement described, as particularly shown in FIGS. 6, 8, 8a, 9, 9a and 14. These cuts are carried out at station A by a common cutter 12C mounted on the spindle 12 as shown in FIG. 6. Arranged to cooperate with the cutter 12C is a pair of bevel cutting guides A20 and A22, both of which are secured to a bracket 24 in angularly disposed and spaced apart relationship as better shown in FIGS. 8 and 9. The bracket A24 is attached to the fence supporting brackets A9 and A10. These members are also shown in FIG. 14 in relation to one another.

In operation a workpiece W10 is supported, as shown in FIG. 8, it being understood that this workpiece comprises a drawer front of the flush type in which a dado and locking tongue have already been cut by means of the cutter 14a in station B. In the position noted, the dimension guide A20 engages in the space between the locking tongue T20 and the lip L20. In this position it will be observed that the cutter 12C will then cut across the lip to provide a bevel cut W12 as shown in FIG. 8a.

In a similar manner, a workpiece W16 consisting of a drawer back also cut on cutter 14A with a locking tongue and lip, is engaged over the dimension guide A22 in the position shown in FIG. 9, but in this position the locking tongue is reversed. The cutter 12C then produces the bevel cut W20 as suggested in FIG. 9a. It will be understood that these bevel dimension guides may be changed in thickness in accordance with the dado and locking tongue cutter which may be made in any given instance.

From the foregoing disclosure it will be seen that I have disclosed an improved combination of adjustable spindles, cutters and dimension guide members arranged in various assemblies to carry out a wide range of novel cutting operations. By means of this combination of parts substantial savings in time and labor are realized and accuracy of cuts and fitting of parts is insured. The unique association of dimension guide members with the other parts disclosed, makes possible quick setup for cutting differently sized stock parts and this may be done throughout a range of required drawer sizes.

It will be understood that while I have shown and described a preferred embodiment of adjustable spindle, cutters and dimension guide members suitable for use in making a lock joint cabinet drawer construction, that I may also apply these cutters and dimension guides to various other cutting operations. For example, I may, on the cutting spindle 16, mount a tenon cutter 16a which can be used to cut portions of a drawer frame. Also, on spindle 14, I may further provide a tenon groove cutter 14b to cut grooves for receiving the tenons formed by the cutter 16a.

These and various other changes and modifications of the invention may be carried out in accordance with the scope of the invention as defined by the appended claims.

I claim:

1. A power tool comprising a stand having a main horizontal work supporting table mounted at the upper side thereof, a plurality of vertically disposed power driven spindles arranged in lateral spaced relationship to one another and extending upwardly through the work supporting table, adjustable spindle holder mechanism mounted below the work supporting table for raising and lowering the spindles, a plurality of vertically spaced adjustable cutting elements fixed to the upper ends of the spindles, a plurality of superimposed work guiding fence means mounted upon the horizontal work supporting table, said fence means including an adjustable horizontal portion and a vertical portion carried thereby, said fence means presenting a plurality of vertical guide surfaces through which the said cutting elements project laterally, interchangeable dimensional guide means detachably secured to the work guiding fence means at one of the said spindles, said dimensional guide means including an elongated guide element which has at least one dimension chosen to correspond to a similar dimension of a cutter on an adjacent spindle.

2. A power tool comprising a stand having a main horizontal work supporting table mounted at the upper side thereof, a plurality of vertically disposed power driven spindles arranged in spaced relationship to one another and extending upwardly through the work supporting table, adjustable spindle holder mechanism mounted below the table for raising and lowering the spindles, a plurality of vertically spaced cutting elements fixed to the upper ends of certain of the spindles, work guiding fence means mounted upon and above the horizontal work supporting table adajcent certain of said cutting elements, said fence means including depending supporting brackets adjustably fixed to said table, said fence means presenting a plurality of vertical guide surfaces through which the adjacent cutting elements project laterally, dimensional guide means detachably secured to the work guiding fence means at one of said spindles, said dimensional guide means consisting of an elongated guide element which has one surface dimension corresponding in size with a dimension of a cutter on a second adjacent spindle whereby the surface of a cut formed in a workpiece by said second cutter, may be supported on said dimensional guide element in predetermined spaced relationship to the said first cutter.

3. A power tool comprising a stand having a horizontal work supporting table mounted at the upper side thereof, a plurality of vertically disposed power driven spindles arranged in spaced relationship to one another and extending upwardly through the work supporting table, adjustable spindle holder mechanism for each of said spindles mounted below the table for selectively raising and lowering the spindles, vertically spaced cutting elements fixed to the upper ends of the spindles, a plurality of work guiding fence means mounted above the horizontal work supporting table in superimposed relation at each of said spindles, said fence means presenting a plurality of vertical guide surfaces through which the said cutting elements project laterally, dimensional guide means detachably secured to the work guiding fence means at one of said spindles, said dimensional guide means consisting of a guide element which presents guide surfaces complementary with cutting surfaces of a cutter on an adjacent second spindle whereby two or more surfaces of a cut formed in a workpiece by said second cutter may be supported on said dimension guide element in a predetermined position.

4. In a woodworking machine of the class which includes a horizontal work table, vertical fence means supported on the table, and a spindle and cutter arranged in the work table, the combination of a dimension guide element detachably secured along the lower portion of the vertical fence means to provide a plurality of guide surfaces which occur in angularly disposed relationship to one another and which are adapted to engage and support a workpiece along the two surfaces simultaneously.

5. A structure according to claim 4 in which dimension guide element is detachably secured to the fence means and said dimension guide element further includes engaging means for moving the guide about a vertical axis of turning to arrange it in predetermined positions of adjustment with respect to the cutting edge of said cutter.

6. A fence element for use with a power tool spindle and cutter, said fence consisting of an elongated guide body having a cutter opening formed therein through which the cutter may extend in predetermined relationship, said elongated fence body being further formed at an opposite side thereof with line viewing apertures which extend from the top of the fence body downwardly and communicate with the cutter opening whereby the arc of cutting of said cutter may be observed in a workpiece at any point in the travel of the workpiece through the cutter along the said fence element.

7. In a woodworking machine of the class which includes a horizontal work table, vertical fence means supported on the table, and a vertical spindle and cutter arranged in the work table, the combination of a dimension guide element having an opening for receiving the cutter laterally therethrough, means for engaging the guide element with opposite ends of said vertical fence means, and said fence means being formed at one end with recesses for adjustably securing said engaging means for that end in varying positions of adjustment thereby to control the location of the dimension guide relative to the said cutter and the depth of cut.

8. A structure according to claim 7 in which the engaging means include resilient clips with intermediate rib portions and the recesses include a plurality of spaced apart vertical grooves for supporting the said rib portions of the resilient clip means in varying positions of spaced relationship to the guide surface of the vertical fence thereby to vary the depth of cut produced by said cutter.

9. In a woodworking machine which includes a main horizontal work table having a forward work position, a plurality of spaced vertical power driven spindles extending upwardly through said main work table, cutters on said spindles positioned above the surface of said main work table, raised work tables supported on said main work table, vertically positioned fence means positioned forward of each of said cutters, said fence means each having openings therein for receiving a cutter laterally therethrough, means mounting the fence means for adjustment of same toward and away from said cutters, at least one of said fence means including a forwardly projecting marginal edge portion seating on the raised work table, and a horizontal dimensional guide adapted to overlie said raised work table, said horizontal dimensional guide having fastening means depending therefrom for engaging the front portion of said work support for retaining same in position and including an inner marginal portion overlying the forwardly projecting portion of the vertical fence means.

10. In a woodworking machine which includes a main horizontal work table, a plurality of spaced vertical power driven spindles extending upwardly through said main work table, cutters on said spindles positioned above the surface of the work table, a plurality of superimposed raised work tables supported on said main work table, means for adjusting the raised work tables, vertically positioned fence means mounted on one of said raised work tables forwardly of a cutter on one of said spindles, said fence means having an opening therein for receiving a cutter laterally therethrough, means mounting the fence means on said raised work table for adjustment of the same toward and away from the adjacent cutter, a horizontal dimensional guide adapted to overlie the raised work table, fastening means secured to the outer face of said horizontal dimensional guide, said fastening means including resilient portions engaging beneath the bottom of the raised work table upon which the guide is supported.

11. A power tool comprising a stand having a main horizontal work supporting table mounted at the upper side thereof defining a plurality of laterally disposed cutting stations, a plurality of vertically disposed power driven spindles arranged in spaced relationship to one another and extending upwardly through the work supporting table at each of the cutting stations, adjustable spindle holder mechanism mounted below the work supporting table for raising and lowering the spindles, a plurality of vertically spaced adjustable cutting elements fixed to the upper ends of the spindles, an independently horizontally adjustable vertical work guiding fence means mounted upon the horizontal work supporting table in superimposed relation at each cutting element, said fence means presenting a plurality of vertical guide surfaces through which each of said cutting elements project laterally, dimensional guide means detachably secured to the work guiding fence means outwardly of the cutting element and against a vertical guide face thereof, and a plurality of raised work tables upon which each of the fence means is supported, said raised work tables each being positioned beneath a cutting element on said spindles and all of said raised work tables being mounted for independent vertical adjustment on supports mounted on the main work table.

12. A power tool comprising a stand having a main horizontal work supporting table mounted at the upper side thereof defining a plurality of laterally disposed cutting stations, a plurality of vertically disposed power driven spindles arranged in spaced relationship to one another and extending upwardly through the work supporting table at each of the cutting stations, adjustable spindle holder mechanism mounted below the work supporting table for raising and lowering the spindles, a plurality of vertically spaced adjustable cutting elements fixed to the upper ends of the spindles, an independently horizontally adjustable vertical work guiding fence means mounted upon the horizontal work supporting table in superimposed relation at each cutting element, said fence means presenting a plurality of vertical guide surfaces through which each of said cutting elements project laterally, dimensional guide means detachably secured to the work guiding fence means outwardly of the cutting element and against a vertical guide face thereof, and a plurality of raised work tables upon which each of the fence means is supported, said raised work tables each being positioned beneath a cutting element on said spindles, and all of said raised work tables being mounted for independent vertical adjustment on horizontally adjustable supports mounted on the main work table.

13. A power tool comprising a stand having a main horizontal work supporting table mounted at the upper side thereof defining a plurality of laterally disposed cutting stations, a plurality of vertically disposed power driven spindles arranged in spaced relationship to one another and extending upwardly through the work supporting table at each of the cutting stations, adjustable spindle holder mechanism mounted below the work supporting table for raising and lowering the spindles, a plurality of vertically spaced adjustable cutting elements fixed to the upper ends of the spindles, an independently horizontally adjustable vertical work guiding fence means mounted upon the horizontal work supporting table in superimposed relation at each cutting element, said fence means presenting a plurality of vertical guide surfaces through which each of said cutting elements project laterally, dimensional guide means detachably secured to the work guiding fence means outwardly of the cutting element and against a vertical guide face thereof, and a plurality of raised work tables upon which each of the fence means is mounted for lateral adjustment, said raised work tables each being positioned beneath a cutting element on said spindles and all of said raised work tables being mounted for independent vertical adjustment on horizontally adjustable supports mounted on the main work table.

14. A power tool comprising a stand having a horizontal work supporting table mounted at the upper side thereof, a plurality of vertically disposed power driven spindles arranged in spaced relationship to one another and extending upwardly through the work supporting table, adjustable spindle holder mechanism for each of said spindles mounted below the table for selectively raising and lowering the spindles, vertically spaced cutting elements fixed to the upper ends of the spindles, a plurality of work guiding fence means mounted above the horizontal work supporting table in superimposed relation at each of said spindles, said fence means presenting a plurality of vertical guide surfaces through which the said cutting elements project laterally, dimensional guide means detachably secured to the work guiding fence means at one of said spindles, said dimensional guide means consisting of a guide element which presents guide surfaces complementary with cutting surfaces of a cutter on an adjacent second spindle whereby two or more surfaces of a cut formed in a workpiece by said second cutter may be supported on said dimension guide element in a predetermined position, and said cutter on the adjacent spindle being shaped to form a dado and tongue cut, and the dimension guide being shaped to fit into said dado and tongue cut.

15. A power tool comprising a stand having a horizontal work supporting table mounted at the upper side thereof, a plurality of vertically disposed power driven spindles arranged in spaced relationship to one another and extending upwardly through the work supporting table, adjustable spindle holder mechanism for each of said spindles mounted below the table for selectively raising and lowering the spindles, vertically spaced cutting elements fixed to the upper ends of the spindles, a plurality of work guiding fence means mounted above the horizontal work supporting table in superimposed relation at each of said spindles, said fence means presenting a plurality of vertical guide surfaces through which the said cutting elements project laterally, dimensional guide means detachably secured to the work guiding fence means at one of said spindles, said dimensional guide means consisting of a guide element which presents guide surfaces complementary with cutting surfaces of a cutter on an adjacent second spindle whereby two or more surfaces of a cut formed in a workpiece by said second cutter may be supported on said dimension guide element in a predetermined position and said cutter on an adjacent spindle being shaped to form a rabbet cut and the dimension guide being shaped to fit into the said rabbet cut.

References Cited by the Examiner

UNITED STATES PATENTS

| 405,389 | 6/1889 | Autenrieth | 144—36 |
| 1,776,238 | 9/1930 | Smith | 144—134 |

FOREIGN PATENTS 529,269  12/1921  France.

WILLIAM W. DYER, JR., *Primary Examiner.*

W. D. BRAY, *Assistant Examiner.*